United States Patent
Wu et al.

(10) Patent No.: US 7,192,664 B1
(45) Date of Patent: Mar. 20, 2007

(54) MAGNETIC ALLOY CONTAINING $TiO_2$ FOR PERPENDICULAR MAGNETIC RECORDING APPLICATION

(75) Inventors: Zhong Wu, Freemont, CA (US); Samuel Dacke Harkness, IV, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 307 days.

(21) Appl. No.: 10/781,637

(22) Filed: Feb. 20, 2004

Related U.S. Application Data

(60) Provisional application No. 60/482,396, filed on Jun. 24, 2003.

(51) Int. Cl.
*G11B 5/66* (2006.01)
*G11B 5/70* (2006.01)

(52) U.S. Cl. .................. 428/836.2; 204/192.2

(58) Field of Classification Search ............. 428/836.2, 428/831, 836.1
See application file for complete search history.

(56) References Cited

U.S. PATENT DOCUMENTS

| 4,780,354 A | 10/1988 | Nakayama et al. |
| 5,290,629 A | 3/1994 | Kobayashi et al. |
| 5,976,326 A | 11/1999 | Ranjan et al. |
| 6,177,208 B1 | 1/2001 | Yamamoto et al. |
| 6,242,085 B1 * | 6/2001 | Ryonai et al. ............... 428/332 |
| 6,699,600 B2 * | 3/2004 | Shimizu et al. ............. 428/828 |
| 2001/0031382 A1 | 10/2001 | Kusakawa et al. |
| 2002/0187368 A1 | 12/2002 | Senzaki et al. |
| 2003/0148143 A1 | 8/2003 | Kanbe et al. |

\* cited by examiner

*Primary Examiner*—Holly Rickman
(74) *Attorney, Agent, or Firm*—McDermott Will & Emery LLP

(57) ABSTRACT

The SMNR of a granular perpendicular recording medium is significantly enhanced by incorporating $TiO_2$ at the grain boundaries of the magnetic alloy layer. Embodiments include granular perpendicular recording media comprising CoPt alloys containing 0.1 to 15 at. % $TiO_2$ and a molar ratio of Pt:Co of up to 0.5.

20 Claims, 3 Drawing Sheets

US 7,192,664 B1

MAGNETIC ALLOY CONTAINING TIO₂ FOR PERPENDICULAR MAGNETIC RECORDING APPLICATION

CROSS-REFERENCE TO PROVISIONAL APPLICATION

This application claims priority from provisional patent application Ser. No. 60/482,396 filed Jun. 24, 2003, the entire disclosure of which is incorporated herein by reference.

FIELD OF THE INVENTION

The present invention relates to high areal recording density granular perpendicular magnetic recording media exhibiting reduced noise and to methods of manufacturing thereof.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities without a similar thermal stability limitation. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

Typically, a magnetically "soft" underlayer ("SUL") layer, i.e., a magnetic layer having a relatively low coercivity below about 1 kOe, such as of a NiFe alloy (Permalloy), is provided between the non-magnetic substrate, e.g., of glass, aluminum (Al) or an Al-based alloy, and the magnetically "hard" recording layer having relatively high coercivity, typically about 3–8 kOe, e.g., of a cobalt-based alloy (e.g., a Co—Cr alloy such as CoCrPtB) having perpendicular anisotropy. The magnetically soft underlayer serves to guide magnetic flux emanating from the head through the hard, perpendicular magnetic recording layer.

A typical conventional perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 2A, 3, 4, and 5, respectively, indicate a non-magnetic substrate, an adhesion layer (optional), a soft magnetic underlayer, at least one non-magnetic interlayer, and at least one perpendicular hard magnetic recording layer. Reference numerals 7 and 8, respectively, indicate the single and auxiliary poles of a single-pole magnetic transducer head 6. The relatively thin interlayer 4 (also referred to as an "intermediate" layer), comprised of one or more layers of non-magnetic materials, serves to (1) prevent magnetic interaction between the soft underlayer 3 and the at least one hard recording layer 5 and (2) promote desired microstructural and magnetic properties of the at least one hard recording layer.

As shown by the arrows in the figure indicating the path of the magnetic flux $\phi$, flux $\phi$ is seen as emanating from single pole 7 of single-pole magnetic transducer head 6, entering and passing through the at least one vertically oriented, hard magnetic recording layer 5 in the region below single pole 7, entering and traveling within soft magnetic underlayer 3 for a distance, and then exiting therefrom and passing through the at least one perpendicular hard magnetic recording layer 5 in the region below auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of polycrystalline layers 4 and 5 of the layer stack constituting medium 1. Magnetically hard main recording layer 5 is formed on interlayer 4, and while the grains of each polycrystalline layer may be of differing widths (as measured in a horizontal direction) represented by a grain size distribution, they are generally in vertical registry (i.e., vertically "correlated" or aligned).

Completing the layer stack is a protective overcoat layer 11, such as of a diamond-like carbon (DLC), formed over hard magnetic layer 5, and a lubricant topcoat layer 12, such as of a perfluoropolyethylene material, formed over the protective overcoat layer.

Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials. Optional adhesion layer 2A, if present, may comprise an up to about 50 Å thick layer of a material such as Ti or a Ti alloy. Soft magnetic underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc. Interlayer 4 typically comprises an up to about 300 Å thick layer or layers of non-magnetic material(s), such as Ru, TiCr, Ru/CoCr₃₇Pt₆, RuCr/CoCrPt, etc.; and the at least one hard magnetic layer 5 is typically comprised of an about 50 to about 250 Å thick layer(s) of Co-based alloy(s) including one or more elements selected from the group consisting of Cr, Fe, Ta, Ni, Mo, Pt, V, Nb, Ge, B, and Pd, iron nitrides or oxides, or a (CoX/Pd or Pt)$_n$ multilayer magnetic superlattice structure, where n is an integer from about 10 to about 25. Each of the alternating, thin layers of Co-based magnetic alloy of the superlattice is from about 2 to about 3.5 Å thick, X is an element selected from the group consisting of Cr, Ta, B, Mo, Pt, W, and Fe, and each of the alternating thin, non-magnetic layers of Pd or Pt is up to about 10 Å thick. Each type of hard magnetic recording layer material has perpendicular anisotropy arising from magneto-crystalline anisotropy ($1^{st}$ type) and/or interfacial anisotropy ($2^{nd}$ type).

Another currently employed way of classifying perpendicular magnetic recording media is on the basis by which the magnetic grains are mutually separated, i.e., segregated, in order to physically and magnetically de-couple the grains and provide improved media performance characteristics. According to this classification scheme, magnetic media with Co-based alloy perpendicular magnetic recording layers (e.g., CoCr alloys) are classified into two distinct types: (1) a first type, wherein segregation of the grains occurs by diffusion of Cr atoms of the magnetic layer to the grain boundaries of the layer to form Cr-rich grain boundaries, which diffusion process requires significant heating of the media substrate prior or during formation (deposition) of the magnetic layer; and (2) a second type, wherein segregation of the grains occurs by formation of oxides and/or nitrides at the boundaries between adjacent magnetic grains to form so-called "granular" media, which oxides and/or nitrides may be formed by introducing a minor amount of at least one reactive gas, i.e., oxygen ($O_2$) and/or nitrogen ($N_2$) to the inert gas (e.g., Ar) atmosphere during sputter deposition of the Co alloy-based perpendicular magnetic layer.

"Granular" perpendicular magnetic recording media may be fabricated by a method wherein the media precursor, i.e., a media substrate with a stack of layers formed thereon, including a just-formed, i.e., topmost, granular perpendicular magnetic recording layer, is removed from the manufacturing apparatus, typically a multi-chamber sputtering apparatus adapted for performing large-scale, automated, continuous manufacture of magnetic recording media, for exposure to the ambient, i.e., $O_2$-containing, atmosphere in order to form a surface oxide layer on the magnetic recording layer prior to deposition of a protective overcoat layer thereon, e.g., a carbon (C)-based layer, such as diamond-like carbon (DLC).

Conventional methodology employed in manufacturing granular perpendicular magnetic recording media employ deposition techniques at elevated temperatures, such as at temperatures in excess of 200° C., for the purpose of achieving grain boundary segregation. Such grain boundary segregation suppresses inter-crystal interaction between respective crystal grains, thereby breaking exchange coupling and reducing noise during recording. However, such high temperature deposition techniques are disadvantageously complex and result in undesirable diffusion of non-magnetic metallic components.

Another technique employed to produce granular perpendicular magnetic recording media comprises reactive sputtering of the magnetic layer in a gas mixture of oxygen and an inert gas, such as argon (Ar), which is intended to form oxides in grain boundaries, thereby breaking down exchange coupling and improving recording performance. However, conventional reactive sputtering techniques result in a disadvantageous non-uniformity in film properties due to rapid oxygen consumption and process instability. Therefore, manufacturing capability is compromised by the lack of process control and a throughput limitation due to additional reactive gas input/stabilization and pump out time.

Accordingly, a need exists for methodology enabling the efficient fabrication of high areal recording density granular perpendicular magnetic recording media with improved recording performance, notably reduced media noise, i.e., signal medium noise ratio (SMNR).

DISCLOSURE OF THE INVENTION

An advantage of the present invention is a granular perpendicular magnetic recording medium exhibiting reduced noise during recording.

Another advantage of the present invention is an efficient, controllable method of manufacturing a granular perpendicular magnetic recording media exhibiting reduced noise during recording.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a granular perpendicular magnetic recording media, comprising: a non-magnetic substrate; and a magnetic alloy layer covering the substrate, wherein: the magnetic layer comprises cobalt (Co), platinum (Pt) and 0.1 to 15 at. % titanium dioxide ($TiO_2$); the molar ratio of Pt:Co is no greater than 0.5; $TiO_2$ is dispersed at grain boundaries of the magnetic alloy; and essentially no silicon dioxide is present at the grain boundaries.

Embodiments of the present invention include granular perpendicular magnetic recording media comprising at least one underlayer and a carbon-containing protective coating, wherein the magnetic alloy layer contains up to 10 at. % of chromium (Cr), molybdenum (Mo), tantalum (Ta), niobium (Nb), boron (B), iron (Fe), nickel (Ni), vanadium (V), germanium (Ge), palladium (Pd), and copper (Cu). Embodiments of the present invention include granular perpendicular magnetic recording media containing a magnetic alloy having a Pt content of 10 to 30 at. %, e.g., 15 to 25 at. %, and 3 to 8 at. % $TiO_2$. In accordance with embodiments of the present invention, about 50% to about 100% of the total amount of $TiO_2$ present in the magnetic alloy layer is segregated at the grain boundaries, or substantially all of the $TiO_2$ present is segregated at the grain boundaries.

Another aspect of the present invention is a method of manufacturing a granular perpendicular magnetic recording medium, the method comprising sputter depositing a magnetic alloy layer, at a temperature of no greater than 100° C., overlying a non-magnetic substrate, wherein: the magnetic alloy comprises cobalt (Co), platinum (Pt) and 0.1 to 15 at. %, titanium dioxide ($TiO_2$); the molar ratio of Pt:Co is no greater than 0.5; $TiO_2$ is dispersed at grain boundaries of the magnetic alloy; and essentially no silicon dioxide is present at the grain boundaries.

Embodiments of the present invention include sputter depositing the magnetic alloy layer at a temperature of no greater than about 100° C., employing a sputtering target of the magnetic alloy containing $TiO_2$ or employing separate targets, one of the magnetic alloy and one containing $TiO_2$. Embodiments of the present invention also include reactive sputter depositing magnetic alloy in an atmosphere of argon and oxygen employing a single target containing the magnetic alloy and titanium, or employing separate targets one containing the magnetic alloy and one containing titanium.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

Figure 1:
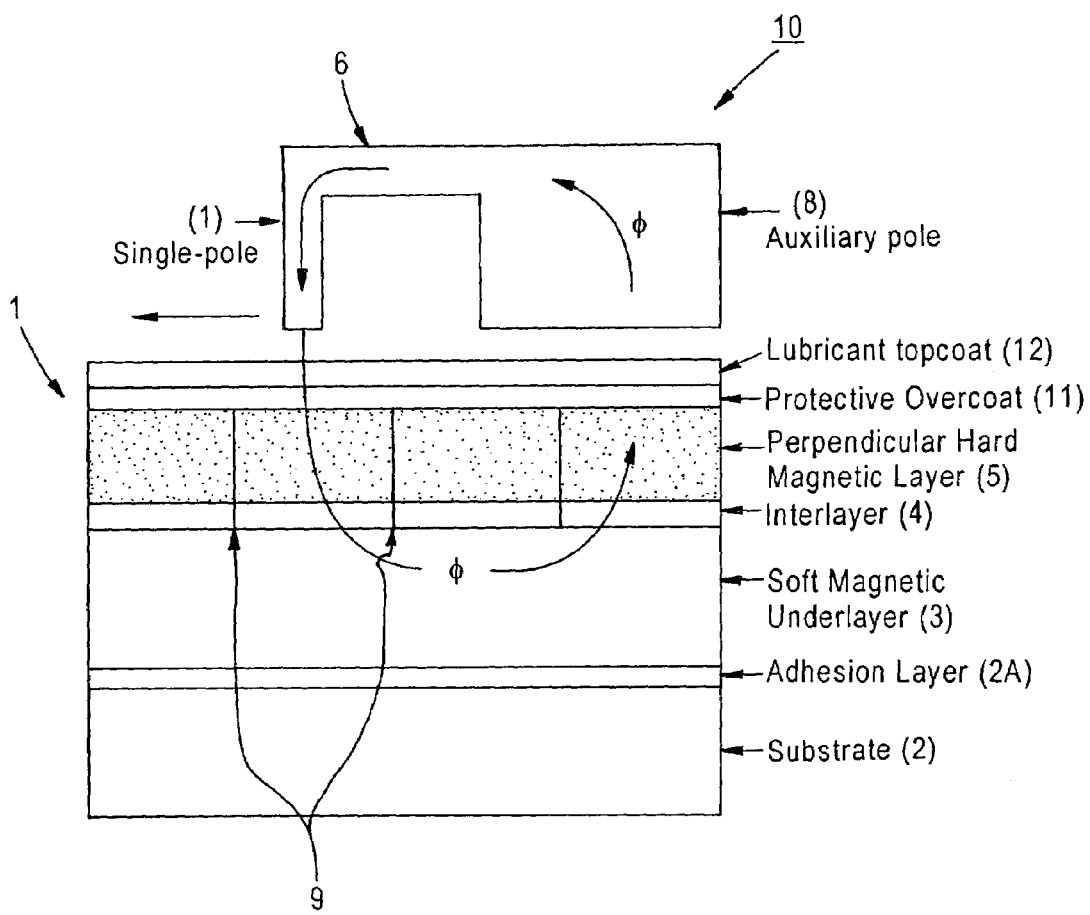
FIG. 1 schematically illustrates a portion of a magnetic recording storage, and retrieval system comprised of a granular perpendicular magnetic recording medium and a single pole transducer head.

The present invention addresses and solves problems, drawbacks, and disadvantages attendant upon conventional techniques employed in the manufacture of granular-type perpendicular magnetic recording media. Such problems stem from the use of high deposition temperatures involving complex methodology and resulting in undesirable diffusion of non-magnetic metallic components, and from difficulties attendant upon conventional reactive sputtering techniques because of the highly reactive nature of oxygen. The present invention strategically employs $TiO_2$ for dispersion at the grain boundaries. It was found that $TiO_2$ is remarkably effective in breaking down the exchange coupling between the magnetic grains, thereby achieving a considerable reduction in noise during recording processes. Advantageously, sputter deposition is conducted at a temperature less than 100° C., such as at room temperature, i.e., about 25° C.

Embodiments of the present invention also include reactive sputtering in an atmosphere of argon and oxygen at a room temperature. It was found that the thermodynamic driving force for the formation of titanium dioxide during reactive sputtering is so favored that titanium can be selectively oxidized and formed at the grain boundary without adversely impacting the uniformity of the thickness of the resulting film and with reduced process instability. Embodiments of the present invention include forming at least one underlayer structure, including the use of an intermediate layer, to present a hcp(0002) orientation for deposition of the magnetic alloy.

Embodiments of the present invention include magnetic alloys of Co and Pt containing $TiO_2$, in an amount of 0.1 to 15 at. %, e.g., 3 to 8 at. %. Magnetic alloys in accordance with embodiments of the present invention typically contain Pt in an amount of 10 to 40 at. %, e.g., 15 to 25 at. %, and up to 10 at. % of Cr, Mo, Ta, Nb, B, Fe, Ni, V, Ge, Pd and Cu, or mixtures thereof. In accordance with embodiments of the present invention, it was found desirable to maintain the molar ratio of Pt to Co at no greater than 0.5, e.g., 0.1 to 0.4. Because of the favorably high thermodynamic driving force of $TiO_2$, the formation of other oxides, such as silicon dioxide, in the grain boundary is neither necessary nor desirable from a process control viewpoint and for film uniformity purposes. Accordingly, embodiments of the present invention comprise magnetic alloy layers wherein substantially no other oxides, such as silicon dioxide, are present at the grain boundaries. By "substantially no" other oxides is meant that, other oxides are not present at the grain boundaries in an amount to have a meaningful impact on noise reduction, e.g., less than 0.5 at. %.

In conducting non-reactive sputtering, temperatures no greater than 100° C. are employed. Desirably, reactive sputter deposition is conducted at room temperature. Sputter deposition may be conducted using a single target containing the magnetic alloy in addition to $TiO_2$. In other embodiments, two separate targets may be employed, one containing the magnetic alloy of Co and Pt, with up to 10% of an additional component, and a separate target containing $TiO_2$.

When employing reactive sputtering in an atmosphere of Ar and $O_2$, a single target containing the magnetic alloy and titanium may be employed, or separate targets one containing the magnetic alloy and one containing titanium may be employed. Reactive sputtering is desirably conducted by using a plasma, thereby enabling a reduction in the deposition temperature down to at most room temperature.

Figure 2:
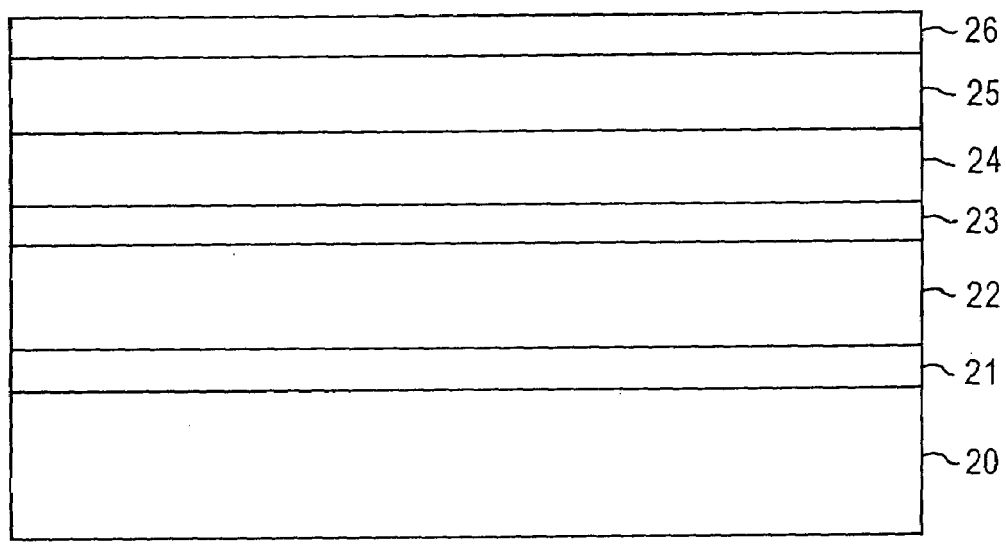
FIG. 2 schematically illustrates a granular perpendicular magnetic recording medium in accordance with an embodiment of the present invention.

An embodiment of a granular perpendicular magnetic recording medium in accordance with the present invention is schematically illustrated in FIG. 2, wherein reference numeral 20 denotes a disk-shaped non-magnetic substrate comprising, for example, a non-magnetic metal or alloy, e.g., Al or an Al-based alloy, such as an Al—Mg alloy having a Ni—P layer plated thereon. In other embodiments of the present invention, substrate 2 may comprise a suitable glass, ceramic, glass-ceramic polymeric material, or a composite laminate of these materials.

Reference numeral 21 denotes a first underlayer or what may be considered an adhesion layer, typically containing Ti or a Ti alloy, and having a thickness up to about 50 Å. Second underlayer 22, which may be considered a soft magnetic underlayer, is typically formed at a thickness of 500 Å to 4000 Å and may comprise Ni, NiFe (Permalloy), Co, CoZr, CoZrCr, CoZrNb, CoFeZrNb, CoFe, Fe, FeN, FeSiAl, FeSiAlN, FeCoB or FeCoC. Optional third underlayer 23 is typically formed at a thickness of 10 Å to 30 Å and may comprise an alloy or metal, such as Ag.

Intermediate layer 24 is typically formed at a thickness of up to 300 Å and comprises a layer or layers of non-magnetic materials, such as Ru, TiCr, RuCr, Ru/CoCr$_{37}$Pt$_3$, or RuCr/CoCrPt.

Magnetic alloy layer 25, i.e., the hard magnetic alloy, is typically deposited at a thickness of about 50 Å to about 250 Å and comprises an alloy of Co, Pt, and up to a total of 10 at. % of additional alloying elements, such as Cr, Mo, Ta, Nb, B, Fe, Ni, V, Ge, Pd, and Cu. In addition, magnetic alloy layer 25 strategically contains $TiO_2$ segregated at the grain boundaries, thereby breaking exchange coupling between the magnetic grains resulting in significantly reduced noise during recording.

Reference numeral 26 denotes a conventional carbon-containing protective overcoat, such as diamond like carbon (DLC). Also provided, although not illustrated, is a conventional lubricant topcoat overlying the carbon-containing protective overcoat 26.

EXAMPLE

A granular perpendicular magnetic recording medium was fabricated employing, with reference to FIG. 2, an Al substrate having a Ni—P layer plated thereon 20, a first underlayer 21 comprising Ti at a thickness of about 35 Å, a second underlayer 22 comprising a FeCoB alloy at a thickness of about 1600 Å, a third underlayer 23 comprising Ag at a thickness of about 15 Å, and an intermediate layer 24 comprising a RuCr$_{10}$ alloy at a thickness of about 200 Å. The magnetic alloy layer 25 comprises Co, 18 at. % Pt and 6 at. % $TiO_2$. It should be understood that the terms titanium dioxide and $TiO_2$ as employed throughout this disclosure are intended to include other oxides of titanium, such as TiO as well as non-stoichiometric amounts of $TiO_2$. The sample prepared also contained a carbon-containing protective overcoat having a thickness of 45 Å.

Recording performance data was measured employing a Guzik tester at 5400 rpm and 500 kfci linear density. A similar reference alloy was measured from a plan-of-record perpendicular granular medium which did not contain the $TiO_2$ addition. The results are tabulated in Table I below:

TABLE I

| Sample ID | MrT Avg. | Iw (mA)p | LF (μVpp) | MF (μVpp) | Mod (%) | OW (dB) | Rev OW (dB) | PW50 (μinch) | S (μVmrs) | Nel (μVmrs) | eSMNR(f) (dB) |
|---|---|---|---|---|---|---|---|---|---|---|---|
| sample | 0.67 | 42.0 | 778.9 | 688.7 | 14.3 | 44.0 | 37.2 | 2.5 | 277.5 | 12.9 | 17.1 |
| reference | 0.89 | 34.7 | 782.5 | 671.6 | 12.1 | 44.6 | 40.1 | 2.7 | 264.5 | 12.9 | 15.8 |

In Table I: MrT denotes magnetic remanance times thickness; Iw denotes writing current; LF denotes low frequency signal; MF denotes mid frequency signal; Mod denotes modulation; OW denotes overwrite; PW50 denotes half pulse width; S denotes integrated signal; Nel denotes electronic noise; and eSMNR(f) denotes equalized signal to medium noise ratio frequency domain.

The results illustrated in Table I clearly show a significantly improved reduction in noise performance and an improvement of eSMNR(f) of more than 1 dB.

Figure 3:
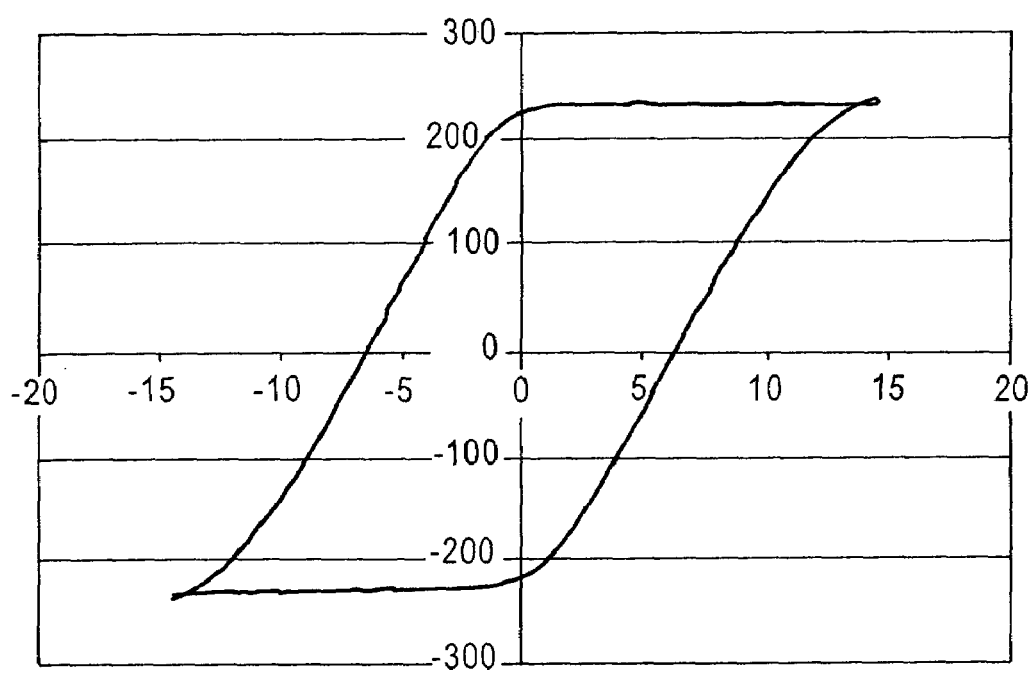
FIG. 3 is a graphical representation of a measurement showing the magneto optical kerr effect (MOKE) loop of an embodiment of the present invention.

FIG. 3 schematically illustrates a MOKE loop for the sample of the present invention subjected to testing (Table I), illustrating a desirable Hc of 6300 Oe and Hn of 900 Oe.

The present invention enables the manufacture of high areal recording density granular perpendicular magnetic recording media having a significant reduction in noise during recording. This objective is achieved by strategically employing $TiO_2$ for grain boundary segregation. The present invention also provides efficient methodology enabling the fabrication of such granular perpendicular magnetic recording media with superior film thickness uniformity and enhanced process control.

The present invention enjoys industrial utility in the fabrication of various types of magnetic recording media. The present invention is particularly applicable in manufacturing various types of granular perpendicular magnetic recording media, regardless of the substrate, for various types of magnetic recording/reproducing devices having a large capacity and high recording density. The present invention enjoys applicability in the manufacture of external storage devices for use in the computer, as well as in various commercial applications.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A granular perpendicular magnetic recording medium comprising: a non-magnetic substrate; and
    a magnetic alloy layer overlying the substrate, wherein:
        the magnetic alloy comprises cobalt (Co), platinum (Pt) and 0.1 to 15 at. % titanium dioxide ($TiO_2$);
        the molar ratio of Pt:Co is no greater than 0.5;
        $TiO_2$ is dispersed at grain boundaries of the magnetic alloy; and
        substantially no silicon dioxide is present at the grain boundaries.

2. The granular perpendicular magnetic recording medium according to claim 1, further comprising:
    at least one underlayer between the non-magnetic substrate and the magnetic alloy layer; and
    a carbon-containing protective overcoat on the magnetic alloy layer.

3. The granular perpendicular magnetic recording medium according to claim 2, wherein the magnetic alloy further comprises up to 10 at. % of at least one element selected from the group consisting of chromium (Cr), molybdenum (Mo), tantalum (Ta), niobium (Nb), boron (B), iron (Fe), nickel (Ni), vanadium (V), germanium (Ge), palladium (Pd), and copper (Cu).

4. The granular perpendicular magnetic recording medium according to claim 3, wherein the Pt content is 10 to 30 at. %.

5. The granular magnetic recording medium according to claim 4, wherein the TiO2 content is 3 to 8 at. %.

6. The granular perpendicular magnetic recording medium according to claim 5, wherein the Pt content is 15 to 25 at. %.

7. The granular perpendicular magnetic recording medium according to claim 4, wherein 50% to 100% of the $TiO_2$ present in the magnetic alloy is segregated at the grain boundaries.

8. The granular perpendicular magnetic recording medium according to claim 4, wherein substantially all of the $TiO_2$ present in the magnetic alloy is segregated at the grain boundaries.

9. The granular perpendicular magnetic recording medium according to claim 4, comprising:
    a first underlayer on the substrate;
    a second underlayer on the first underlayer;
    a third underlayer on the second underlayer;
    an intermediate layer on the third underlayer;
    the magnetic layer on the intermediate layer; and
    a carbon-containing overcoat on the magnetic layer.

10. The granular perpendicular magnetic recording medium according to claim 9, wherein:
    the substrate comprises an aluminum or aluminum alloy having a layer of nickel-phosphorous plated thereon;
    the first underlayer comprises titanium or an alloy thereof;
    the second underlayer comprises an alloy of iron, cobalt and boron;
    the third underlayer comprises silver; and
    the intermediate layer comprises an alloy of ruthenium and chromium.

11. The granular magnetic recording medium according to claim 10, wherein: the first underlayer has a thickness of 5 Å to 50 Å;
    the second underlayer has a thickness of 500 Å to 4,000 Å;
    the third underlayer has a thickness of 10 Å to 30 Å; and
    the intermediate layer has a thickness of 50 Å to 300 Å.

12. A method of manufacturing a granular perpendicular magnetic recording medium, the method comprising sputter depositing a magnetic alloy layer, at. a temperature no greater than 100° C., over a non-magnetic substrate, wherein:
- the magnetic alloy comprises cobalt (Co), platinum (Pt), and 0.1 to 15 at. % titanium dioxide ($TiO_2$);
- the molar ratio of Pt:Co is no greater than 0.5;
- $TiO_2$ is dispersed at grain boundaries of the magnetic alloy; and
- essentially no silicon dioxide is present at the grain boundaries.

13. The method according to claim 12, comprising depositing at least one underlayer over the substrate, and sputter depositing the magnetic alloy over the underlayer.

14. The method according to claim 13, comprising sputter depositing the magnetic alloy at a temperature of about 25° C.

15. The method according to claim 14, comprising sputter depositing the magnetic alloy using a single target containing the magnetic alloy and $TiO_2$.

16. The method according to claim 14, comprising sputter depositing the magnetic alloy using a separate target containing the magnetic alloy and a separate target containing $TiO_2$.

17. The method according to claim 14, comprising reactive sputter depositing the magnetic alloy in an atmosphere containing argon and oxygen.

18. The method according to claim 17, comprising reactive sputter depositing the magnetic alloy using a separate target comprising the magnetic alloy and a separate target comprising titanium.

19. The method according to claim 17, comprising reactive sputter depositing of the magnetic alloy using a single target comprising the magnetic alloy and titanium.

20. The method according to claim 14, wherein the magnetic alloy comprises Pt in an amount of 10 to 30 at. % and up to 10% of at least one element selected from the group consisting of chromium (Cr), molybdenum (Mo), tantalum (Ta), niobium (Nb), boron (B), iron (Fe), nickel (Ni), vanadium (V), germanium (Ge), palladium (Pd), and copper (Cu).

* * * * *